*INVENTOR.*
WILLIAM A. HIGINBOTHAM
*BY*
William D. Hall
*ATTORNEY*

*INVENTOR.*
WILLIAM A. HIGINBOTHAM
*BY*
William D. Hall
*ATTORNEY*

Patented May 20, 1952 2,597,322

UNITED STATES PATENT OFFICE 2,597,322

PULSE GENERATOR CIRCUIT

William A. Higinbotham, Santa Fe, N. Mex., assignor, by mesne assignments, to the United States of America as represented by the Secretary of War Application September 14, 1945, Serial No. 616,377

5 Claims. (Cl. 250—27)

This invention relates to electrical circuits and more particularly to signal generator circuits.

In many electronic applications use is made of voltage waveforms that have a linear rise with respect to time. This type of waveform is usually referred to as a sawtooth voltage waveform. It is well known in the art that a series combination of a resistor and a capacitor will produce a voltage having an exponentially rising waveform across the capacitor when a potential difference is applied across the combination. It is also known that this exponential characteristic may be assumed to be linear only if a very small portion of the waveform is used. For the purpose of setting the limits of the desired operating portion of the charging characteristic, electron tubes have been used as switch means associated with the resistance-capacitance combination. It should be recognized that the waveforms produced by circuits such as described above are only approximately linear and do not possess many of the advantages of a strictly linear characteristic.

It is an object of the present invention, therefore, to present a circuit that will produce a voltage waveform that has a substantially linear rise as a function of time.

Another object of the present invention is to provide novel means for adjusting the rate of rise of a sawtooth waveform.

In accordance with the present invention there are provided a capacitor and means for charging the capacitor. A vacuum tube switch means is connected to the capacitor. A cathode follower is connected to the capacitor and the charging means therefor. A control signal is applied to the vacuum tube switching means from a suitable source.

For a better understanding of the invention, together with other and further objects thereof, reference is had to the following description taken in connection with the accompanying drawings in which.

Figure 1:
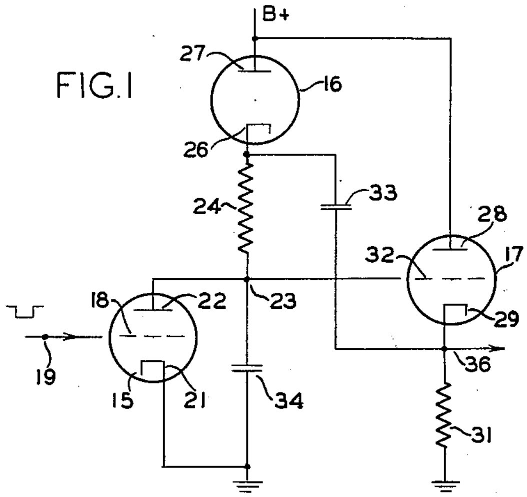
Fig. 1 is a circuit diagram of an embodiment of the present invention.

Referring now to Fig. 1, there is shown an embodiment of the present invention capable of producing a voltage having a substantially sawtooth waveform. This system employs three vacuum tubes, namely, tubes 15, 16, and 17. Vacuum tube 15 in this embodiment of the invention is a triode tube, but it may be any of the multielectrode tubes that will perform essentially the same function as a triode tube. Grid 18 of tube 15 is adapted to receive a signal that is applied at point 19. Cathode 21 is connected to ground while anode 22 is connected to point 23. A resistor 24 is connected from point 23 to the cathode 26 of tube 16. Tube 16 is a diode tube having an anode 27 which is returned to a suitable source of B+ potential. Vacuum tube 17, in this embodiment a triode tube, is connected as a cathode follower. Anode 28 of this tube is returned to a source of B+ potential while cathode 29 is connected to ground through a cathode load resistor 31. Control grid 32 of tube 17 is connected to point 23. A capacitor 33 is connected between cathode 26 of tube 16 and cathode 29 of tube 17, and a second capacitor 34 is connected from point 23 to ground. An output signal may be taken from cathode 29 of tube 17 as indicated by connection 36.

Figure 2:
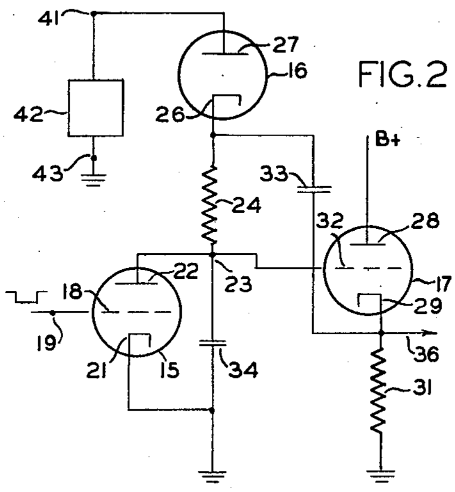
Fig. 2 shows an embodiment similar to the embodiment of Fig. 1.

Referring now to Fig. 2, there is shown an embodiment of the present invention similar to the embodiment shown in Fig. 1. Like parts in Figs. 1 and 2 are given like numbers. The circuit of Fig. 2 differs from the circuit of Fig. 1 in that the anode 27 of tube 16 is connected to the positive terminal 41 of a voltage source 42 rather than to B+ as was the case in Fig. 1. A negative terminal 43 of voltage source 42 is connected to ground.

Figure 3:
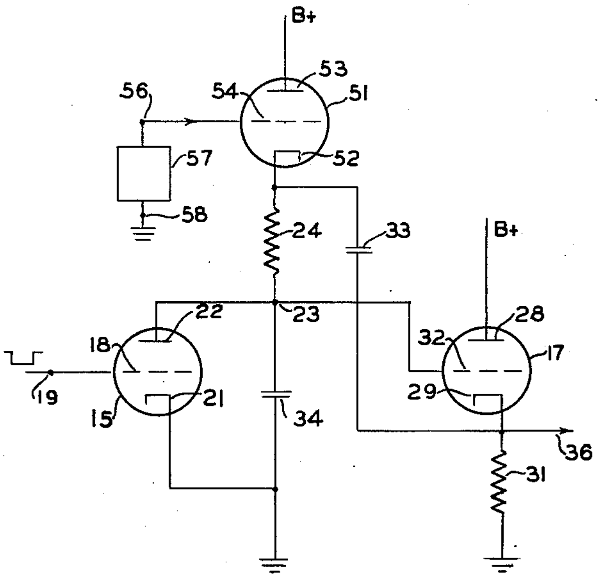
Fig. 3 illustrates a modified embodiment of the present invention.

Referring now to Fig. 3 of the drawings, there is shown an embodiment of the present invention that differs slightly from the circuits of Figs. 1 and 2.

Parts in the circuit of Fig. 3 are numbered to correspond to like parts in Fig. 1. In this embodiment of the invention a triode vacuum tube 51 replaces diode tube 16 of Figs. 1 and 2. Resistor 24 and capacitor 33 are connected to cathode 52 of tube 51. Anode 53 of tube 51 is connected to a suitable source of B+ potential while control grid 54 is connected to terminal 56 of a voltage source 57. A second terminal 58 of source 57 is connected to ground.

Figure 4:
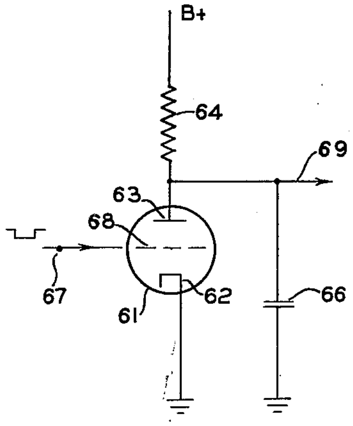
Fig. 4 shows a type of conventional sawtooth generator circuit.

Fig. 4 of the drawings shows a conventional sawtooth generator in which a triode vacuum tube 61 has a cathode 62 connected to ground and an anode 63 connected to a suitable source of B+ potential through a resistor 64. A capacitor 66 is connected between anode 63 and ground. A connection 67 is made to a control grid 68 of tube 61, and a connection 69 to anode 63 provides means for obtaining an output from this circuit.

Figure 5:
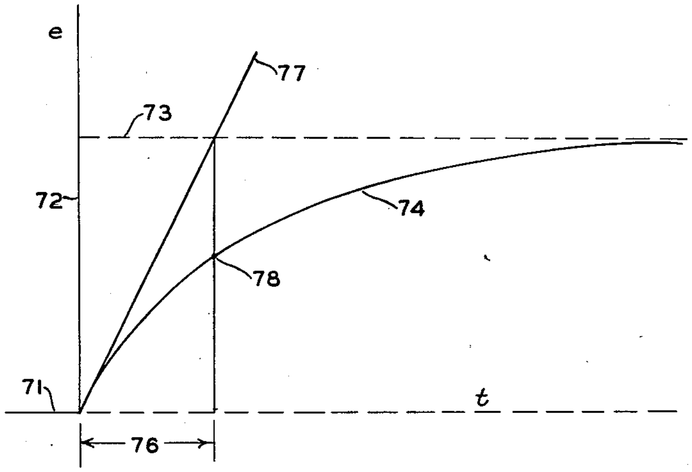
Fig. 5 is a plot of waveforms related to Fig. 4.
Figure 6:
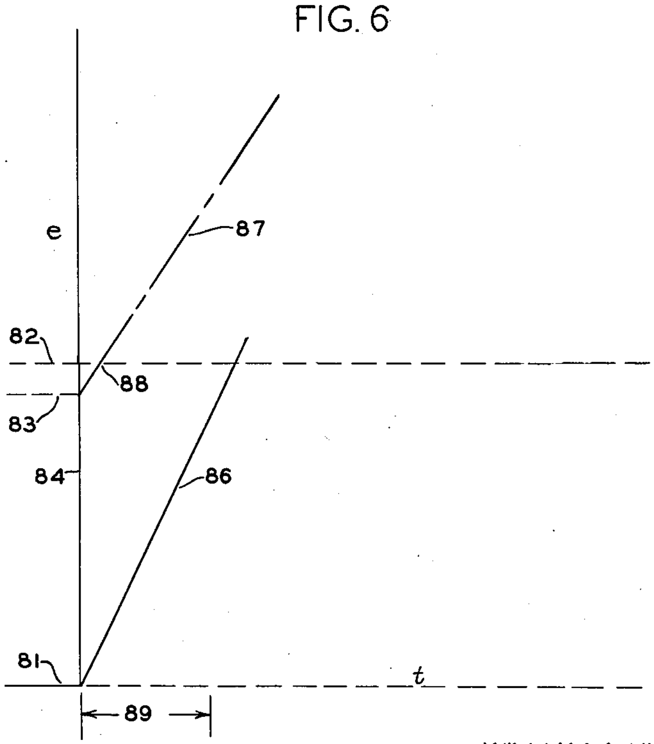
Fig. 6 is a plot of waveforms related to Figs. 1, 2 and 3.

Figs. 5 and 6 will be described in connection with the operation of Figs. 1–4.

In the operation of the conventional sawtooth generator circuit shown in Fig. 4 a negative blanking gate is applied at point 67. This negative blanking gate is sufficient to cause plate current cutoff in tube 61. Immediately before the gate is applied, the potential of anode 63 is at some low value represented by voltage 71 in Fig. 5, which is a plot of instantaneous voltage *"e"* against time *"t."* It will be assumed that the blanking gate starts at time 72 in Fig. 5. As soon as plate current is cut off in tube 61, Fig. 4, capacitor 66 which was charged to potential 71, Fig. 5, will start to charge to the B+ potential represented by potential 73. Capacitor 66 charges through resistor 64 so the potential at anode 63 will follow an exponential curve as represented by line 74. It is well known in the art that this exponential curve will have an initial slope of D/RC where D is the difference in potential, in volts, between potentials 71 and 72 and RC is the time constant of the charging circuit, R being the resistance of resistor 64, in ohms, and C the capacitance of capacitor 66, in farads. This time constant is represented by time interval 76 of Fig. 5. It can be seen that the potential of anode 63 would reach the level 73 in time interval 76 if the voltage rise followed the straight line 77 which has a slope equal to the initial slope of curve 74. It is known, however, that the exponential 74 rises to a potential of approximately .63D above potential 71 in the time interval 76, and the slope at point 78 on curve 74 at a time 72 plus time interval 76 is approximately .37 D/RC, which is .37 times the initial slope. When the negative gate is removed from grid 68, Fig. 4, condenser 66 discharges rapidly through tube 61, and the potential of anode 63 drops rapidly to potential 71. This drop is not shown in Fig. 5.

It is obvious from the foregoing discussion that a linearly rising sawtooth can be roughly approximated by this circuit only if the time interval that anode 63 is allowed to rise is much less than time interval 76 and only if the difference D as defined above is much greater than the actual rise in potential of anode 63 during the period of application of the blanking gate.

It will be obvious to those familiar with this type of circuit that these disadvantages make the circuit of Fig. 4 very undesirable in many applications.

The circuits shown in Figs. 1, 2, and 3 are designed to eliminate the disadvantages mentioned above as will be apparent from the following explanation. In the circuit of Fig. 1, tube 15 is normally conducting and anode 22 is at some low potential as represented by potential 81 in Fig. 6, which is a plot of instantaneous potential *"e"* against time *"t."* Anode 27 of tube 16 is at B+ potential as represented by potential 82, Fig. 6. Cathode 26 is at a potential slightly lower than the potential of anode 27 due to the drop in voltage between anode 27 and cathode 26. The potential of cathode 26 is represented by the line 83, Fig. 6.

At a time represented by line 84, Fig. 6, a negative gate is applied at point 19, Fig. 1. This negative gate causes the potential of grid 18 to drop below the potential of cathode 21 by a sufficient amount to cut off the anode current in tube 15. The potential of anode 22 starts to rise toward the potential of cathode 26. This exponential has a time constant of approximately RC where R is the resistance of resistor 24, in ohms, and C is the capacitance of capacitor 34, in farads. As soon as anode 22, or point 23, starts to rise, grid 32 of tube 17 starts to rise in potential. Since tube 17 is connectend in a cathode follower circuit, cathode 29 rises in potential when grid 32 rises. Capacitor 33 is relatively large so that the potential difference between cathodes 29 and 26 will remain substantially constant during the time intervals being considered. When cathode 29 rises in potential, cathode 26 also rises in potential. The potential on anode 22 is represented by line 86, Fig. 6, while the potential of cathode 26 is represented by line 87, Fig. 6. At point 88 the potental of cathode 26 rises to the potential of anode 27 so that tube 16 stops conducting. Thereafter the charging current for capacitor 34, Fig. 1, is supplied solely by capacitor 33. Since the capacitance of capacitor 34 is much less than the capacitance of capacitor 33, the potential across capacitor 34 increases considerably while the potential across capacitor 33 remains substantially unchanged. The slope of curve 86, Fig. 6, would normally tend to decrease as capacitor 34 is charged, but the potential toward which capacitor 34 is charging represented by curve 87 is also rising. The result is that the potential across capacitor 34, hence the potential at point 23, Fig. 1, rises along a substantially linear path. Since the potential of grid 32 of tube 17 rises linearly with respect to time due to its connection to point 23, the output signal at point 36 also rises linearly with respect to time due to its connection to cathode 29 of tube 17. Condenser 34 discharges rapidly through tube 15 when the negative potential is removed from grid 18 at the conclusion of the blanking gate. The charge that was removed from capacitor 33 during the time tube 15 was cut off is replaced by current flowing through tube 16. The drop in potential at anode 22 is not shown in Fig. 6.

While no attempt has been made in Fig. 6 to show the limits in time or voltage rise over which line 86 is substantially linear, it should be understood that the useful time interval as compared with the time constant RC of the circuit (shown as interval 89 in Fig. 6) in the case of the circuit of Fig. 1 is much greater than the corresponding useful time interval in the case of the conventional circuit of Fig. 4, it being assumed, of course, that the same degree of linearity is desired in the outputs of Figs. 1 and 4. Fig. 6 also shows that the ratio of linear voltage rise to B+ voltage is much higher for the circuit of Fig. 1 than it is for the circuit of Fig. 4. For the above stated reasons the circuit of Fig. 1 is preferable to the circuit of Fig. 4 in any situation that requires a substantially linear sawtooth voltage waveform.

The circuit of Fig. 2 is similar to that of Fig. 1 except that the potential of anode 27 may be varied by varying the potential supplied by voltage source 42. Changing the potential of anode 27 will change the slope of the potential rise at point 23 without substantially changing the linearity of the rise. This circuit is preferable to the circuit of Fig. 1 in situations which require that the rate of rise of the sawtooth waveform be variable.

The operation of the circuit of Fig. 3 is essentially the same as the operation of the circuits of Figs. 1 and 2. In Fig. 3 a triode 51 replaces the diode 16 of Fig. 2. The potential at cathode 52 of tube 51 may be varied by adjusting the potential supplied by source 57 to grid 54. This circuit is an improvement over the circuit of Fig. 2 in that source 57 may have a high impedance yet capacitor 33 may charge rapidly through the low impedance of tube 51. Varying the potential on grid 54 changes the slope of the sawtooth waveform at point 36 in the same manner that changing the potential on anode 27 of Fig. 2 changed the slope of this waveform.

While there have been described what are at present considered the preferred embodiments of the invention, it will be obvious to those skilled in the art that various changes and modifications may be made therein without departing from the invention.

I claim:

1. A signal generator circuit comprising a first capacitor, electronic switching means, means for connecting said switching means to said first capacitor, means for applying a signal to said switching means, means for charging said first capacitor comprising a first resistor and a first vacuum tube having at least an anode and a cathode, means connecting said anode in said first vacuum tube to a suitable source of positive potential, said first resistor and said first capacitor being connected in series in the cathode return circuit of said first vacuum tube, a second vacuum tube having at least a cathode, an anode, and a grid, means connecting said anode in said second vacuum tube to a source of positive potential, a second resistor, said second resistor being connected in the cathode return circuit of said second vacuum tube, a second capacitor for connecting said cathode in said second vacuum tube to said cathode in said first vacuum tube, and means for connecting said first capacitor to said grid in said second vacuum tube.

2. A signal generator circuit comprising a first capacitor, electronic switching means, means for connecting said switching means to said first capacitor, means for applying a signal to said switching means, means for charging said first capacitor comprising a first resistor and a first vacuum tube having at least an anode and a cathode, a source of variable direct-current potential, means for connecting said source of potential to said anode of said first vacuum tube means, said first resistor and said first capacitor being connected in series in the cathode return circuit of said first vacuum tube, a second vacuum tube having at least a cathode, an anode and a grid, means connecting said anode in said second vacuum tube to a source of positive potential, a second resistor, said second resistor being connected in the cathode return circuit of said second vacuum tube, a second capacitor for connecting said cathode of said first vacuum tube to said cathode in said second vacuum tube, and means for connecting said grid in said second vacuum tube to said first capacitor.

3. A signal generator circuit comprising a first capacitor, electronic switching means, means for connecting said switching means to said first capacitor, means for applying a signal to said switching means, means for charging said first capacitor comprising a first resistor and a first vacuum tube having at least a cathode, an anode and a grid, a source of variable direct-current potential, means for connecting said anode of said first vacuum tube to a suitable source of positive potential, means for connecting said source of variable potential to said grid of said first vacuum tube, said first resistor and said first capacitor being connected in series in the cathode return circuit of said first vacuum tube, a second vacuum tube having at least a cathode, an anode and a grid, means connecting said anode in said second vacuum tube to a source of positive potential, a second resistor, said second resistor being connected in the cathode return circuit of said second vacuum tube, means for connecting said grid of said second vacuum tube to said first capacitor, and a second capacitor for connecting said cathode of said first vacuum tube to said cathode of said second vacuum tube.

4. A sawtooth wave generator circuit comprising a first capacitor, a first resistor in series with said capacitor, an electron discharge device having an anode and cathode, said cathode being connected in series with said first resistor and capacitor, a source of direct current potential for charging said capacitor connected to said anode, switching means for causing said source of potential to charge said capacitor for a predetermined interval, a vacuum tube containing at least a cathode, grid and anode, means for connecting said anode of said vacuum tube to a source of positive potential, a second resistor connected in the cathode return circuit of said vacuum tube, means for connecting the grid of said vacuum tube to the junction of said first resistor and capacitor and a second capacitor for connecting the cathode of said vacuum tube to the cathode of said electron discharge device.

5. A sawtooth wave generator, as defined in claim 4, wherein said electron discharge device includes a control grid and means for impressing a varying potential on said control grid to vary the amplitude of the sawtooth waves.

WILLIAM A. HIGINBOTHAM.

REFERENCES CITED

The following references are of record in the file of this patent:

UNITED STATES PATENTS

| Number | Name | Date |
|---|---|---|
| 2,155,210 | Young | Apr. 18, 1939 |
| 2,230,926 | Bingley | Feb. 4, 1941 |
| 2,412,063 | Rosentreter | Dec. 3, 1946 |
| 2,412,064 | Moe | Dec. 3, 1946 |